United States Patent
Whitehead

(12) 
(10) Patent No.: US 6,437,921 B1
(45) Date of Patent: Aug. 20, 2002

(54) TOTAL INTERNAL REFLECTION PRISMATICALLY INTERLEAVED REFLECTIVE FILM DISPLAY SCREEN

(75) Inventor: Lorne A. Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/928,730

(22) Filed: Aug. 14, 2001

(51) Int. Cl.[7] .......................... G02B 27/12; G02B 27/10
(52) U.S. Cl. ..................... 359/640; 359/627; 359/628
(58) Field of Search ................................ 359/222, 296, 359/627, 628, 640; 385/146, 129

(56) References Cited

U.S. PATENT DOCUMENTS 3,291,554 A  12/1966  Price ........................ 359/222

(List continued on next page.)

FOREIGN PATENT DOCUMENTS

| DE | 3720861 A | 3/1989 |
| DE | 4343808 A1 | 6/1995 |
| EP | 0023741 A1 | 2/1981 |
| EP | 204427 A | 12/1986 |
| EP | 728799 A1 | 8/1996 |
| EP | 797127 A | 9/1997 |
| EP | 0807832 A2 | 11/1997 |
| GB | 2265024 A | 9/1993 |
| JP | 54057576 | 5/1979 |
| JP | 59078816 | 5/1984 |
| JP | 60038130 | 2/1985 |
| WO | WO 01/37627 | 5/2001 |

OTHER PUBLICATIONS

"Subdivided Electrophoretic Display", Harbour et al, Xerox Disclosure Journal, vol. 4, No. 6, Nov. 1979, p. 705.
"Simplified Ray Tracing in Cylindrical Systems", L.A. Whitehead, Applied Optics, vol. 21, No. 19, pp. 3536–3538, Oct. 1, 1982.

(List continued on next page.)

*Primary Examiner*—Ricky Mack
*Assistant Examiner*—Omar Hindi
(74) *Attorney, Agent, or Firm*—Oyen Wiggs Green & Mutala

(57) ABSTRACT

A reflective image display screen formed of two reflective sheets. The first sheet has a prismatic inward surface and an opposed outward viewing surface. The second sheet has a prismatic outward surface and an opposed inward surface. The second sheet's outward surface is prismatically interleaved with the first sheet's inward surface. An air gap substantially 0.5 μm thick is left between the prismatically interleaved surfaces. The prismatic surfaces each constitute a plurality of 60° included angle, parallel, linearly extending prisms. The first sheet's outward viewing surface and the second sheet's inward surface are flat. The sheets may be formed of a polycarbonate material having a refractive index of about 1.59.

10 Claims, 2 Drawing Sheets

U.S. PATENT DOCUMENTS

| | | | |
|---|---|---|---|
| 3,556,638 A | 1/1971 | Banks et al. | 359/222 |
| 3,571,511 A | 3/1971 | Myer | 348/759 |
| 3,612,653 A | 10/1971 | Rajchman | 359/297 |
| 3,698,793 A | 10/1972 | Tellerman | 359/290 |
| 3,730,608 A | 5/1973 | Castegnier | 359/297 |
| 3,746,785 A | 7/1973 | Goodrich | 348/771 |
| 3,796,480 A | 3/1974 | Preston, Jr. et al. | 359/295 |
| 3,987,668 A | 10/1976 | Popenoe | 116/212 |
| 4,113,360 A | 9/1978 | Baur et al. | 345/84 |
| 4,135,960 A | 1/1979 | Shuppert et al. | 156/240 |
| 4,148,563 A | 4/1979 | Herbert | 359/222 |
| 4,156,745 A | 5/1979 | Hatzakis et al. | 430/296 |
| 4,165,155 A | 8/1979 | Gordon, II et al. | 359/227 |
| 4,218,302 A | 8/1980 | Dalisa et al. | 359/296 |
| 4,249,814 A | 2/1981 | Hull et al. | 396/457 |
| 4,324,456 A | 4/1982 | Dalisa | 359/296 |
| 4,391,490 A | 7/1983 | Hartke | 359/263 |
| 4,448,622 A | 5/1984 | Duchane et al. | 156/155 |
| 4,536,061 A | 8/1985 | Nishimura | 359/242 |
| 4,714,326 A | 12/1987 | Usui et al. | 359/222 |
| 4,867,515 A | 9/1989 | Normandin | 385/1 |
| 5,045,847 A | 9/1991 | Tarui et al. | 345/84 |
| 5,099,343 A | 3/1992 | Margerum et al. | 349/63 |
| 5,128,782 A | 7/1992 | Wood | 349/61 |
| 5,147,519 A | 9/1992 | Legge | 204/192.2 |
| 5,221,987 A | 6/1993 | Laughlin | 359/222 |
| 5,235,463 A | 8/1993 | Broussoux et al. | 359/642 |
| 5,283,148 A | 2/1994 | Rao | 430/114 |
| 5,301,009 A | 4/1994 | Shurtz, II | 359/487 |
| 5,317,667 A | 5/1994 | Weber et al. | 385/147 |
| 5,319,491 A | 6/1994 | Selbrede | 359/291 |
| 5,396,350 A | 3/1995 | Beeson et al. | 349/62 |
| 5,397,669 A | 3/1995 | Rao | 430/114 |
| 5,425,710 A | 6/1995 | Khair et al. | 604/103 |
| 5,455,709 A | 10/1995 | Dula, III et al. | 359/245 |
| 5,530,053 A | 6/1996 | Rao et al. | 524/462 |
| 5,530,067 A | 6/1996 | Rao et al. | 525/279 |
| 5,555,327 A | 9/1996 | Laughlin | 385/16 |
| 5,555,558 A | 9/1996 | Laughlin | 385/16 |
| 5,561,541 A | 10/1996 | Sharp et al. | 349/104 |
| 5,566,260 A | 10/1996 | Laughlin | 385/16 |
| 5,598,280 A | 1/1997 | Nishio et al. | 349/57 |
| 5,608,837 A | 3/1997 | Tai et al. | 385/146 |
| 5,745,632 A | 4/1998 | Dreyer | 385/133 |
| 5,841,916 A | 11/1998 | Laughlin | 385/16 |
| 5,880,886 A | 3/1999 | Milner | 359/599 |
| 5,959,777 A | 9/1999 | Whitehead | 359/618 |
| 5,999,307 A | 12/1999 | Whitehead | 359/298 |
| 6,064,784 A | 5/2000 | Whitehead et al. | 385/18 |
| 6,088,013 A | 7/2000 | Montour et al. | 345/109 |
| 6,215,920 B1 | 4/2001 | Whitehead et al. | 585/118 |
| 6,304,365 B1 * | 10/2001 | Whitehead | 359/296 |
| 6,384,979 B1 * | 5/2002 | Whitehead et al. | 359/619 |
| 6,335,999 B1 * | 6/2002 | Winston et al. | 385/146 |

OTHER PUBLICATIONS

"Surface Property Changes Induced in Poly(1–Hexene) Elastomer By High Energy Ion Irradition", Carlson et al, Proc. 4th Intl. Conf. on Ion Beam Modification of Materials, Ithaca, NY, Jul. 16–20, 1984 pp. 507–512.

"Evanescent–wave scattering by electrophoretic microparticles: a mechanism for optical switching", Remillard et al, Applied Optics, vol. 34, No. 19, Jul. 1, 1995, pp. 3777–3785.

"Patented fiber switch revs speed, cuts cost", George Kotelly, in "Lightwave" Oct., 1995 web site publication of PennWell Publishing Co., Tulsa, OK.

"Colloidal Refractometry: Meaning and Measurement of Refractive Index for Dispersions; The Science That Time Forgot", M. Mohammadi, Advances in Colloid and Interface Science 62 (1995) 17–29.

"Elastomer Light Valves", Qin et al, Advanced Materials 1997, 9, No. 5, pp. 407–410.

3M Fluorinert™ Electronic Liquid brochure, http://www.3m.com/fluids/florinrt.html, Sep., 1998.

Neufeldt, Victoria. Webster's New World Dictionary of American English, 3rd College Edition. Webster's New World, New York, New York, p. 857. Dec. 31, 1998.

"New Refractive Display Based on Total Internal Reflection in Prismatic Microstructures", Michele A. Mossman et al, Intl. Display Research Conference of the Society for Information Display, Sep., 2000.

* cited by examiner

TOTAL INTERNAL REFLECTION PRISMATICALLY INTERLEAVED REFLECTIVE FILM DISPLAY SCREEN

TECHNICAL FIELD

A high reflectivity image display screen formed of two prismatically interleaved reflective sheets.

BACKGROUND

U.S. Pat. Application Ser. No. 09/585,552 which is incorporated herein by reference (the '552 application), describes a reflective (i.e. front-lit) image display for viewing images in a preferred viewing direction. The display has parallel, macroscopically planar, structured surface (preferably prismatic), non-light absorptive light deflecting and reflecting portions which are longitudinally symmetrical in mutually perpendicular directions, both of which are perpendicular to the preferred viewing direction. A liquid electrophoretic medium containing a particulate suspension contacts the light reflecting portion. A controller applies an electromagnetic force to selectively electrophoretically move the particles into the evanescent wave region adjacent the light reflecting portion to frustrate total internal reflection of light rays at selected points on the light reflecting portion.

The structured surfaces on the light deflecting portion deflect light rays incident in the preferred viewing direction toward the light reflecting portion by imparting to the rays a directional component in the direction of longitudinal symmetry of the light reflecting portion. The structured surfaces on the light reflecting portion totally internally reflect the deflected light rays toward the light deflecting portion at points other than the selected points at which TIR is frustrated. Then, the structured surfaces on the light deflecting portion again deflect the totally internally reflected light rays, cancelling the directional component therefrom, such that the deflected totally internally reflected light rays emerge from the display in a direction substantially parallel to the preferred viewing direction.

This invention provides a simplified screen structure for a reflective display having light deflecting and reflecting portions as described above. Significantly, the invention is amenable to use with lower refractive index materials including conventional plastics such as polycarbonate, which has a refractive index n of about 1.59.

SUMMARY OF INVENTION

The invention provides a reflective image display screen formed of two reflective sheets. The first sheet has a prismatic inward surface and an opposed outward viewing surface. The second sheet has a prismatic outward surface and an opposed inward surface. The second sheet's outward surface is prismatically interleaved with the first sheet's inward surface. An air gap substantially 0.5 $\mu$m thick is left between the prismatically interleaved surfaces. The prismatic surfaces preferably each comprise a plurality of 60° included angle, parallel, linearly extending prisms. The first sheet's outward viewing surface and the second sheet's inward surface are flat. The sheets may be formed of polycarbonate having a refractive index n of about 1.59.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
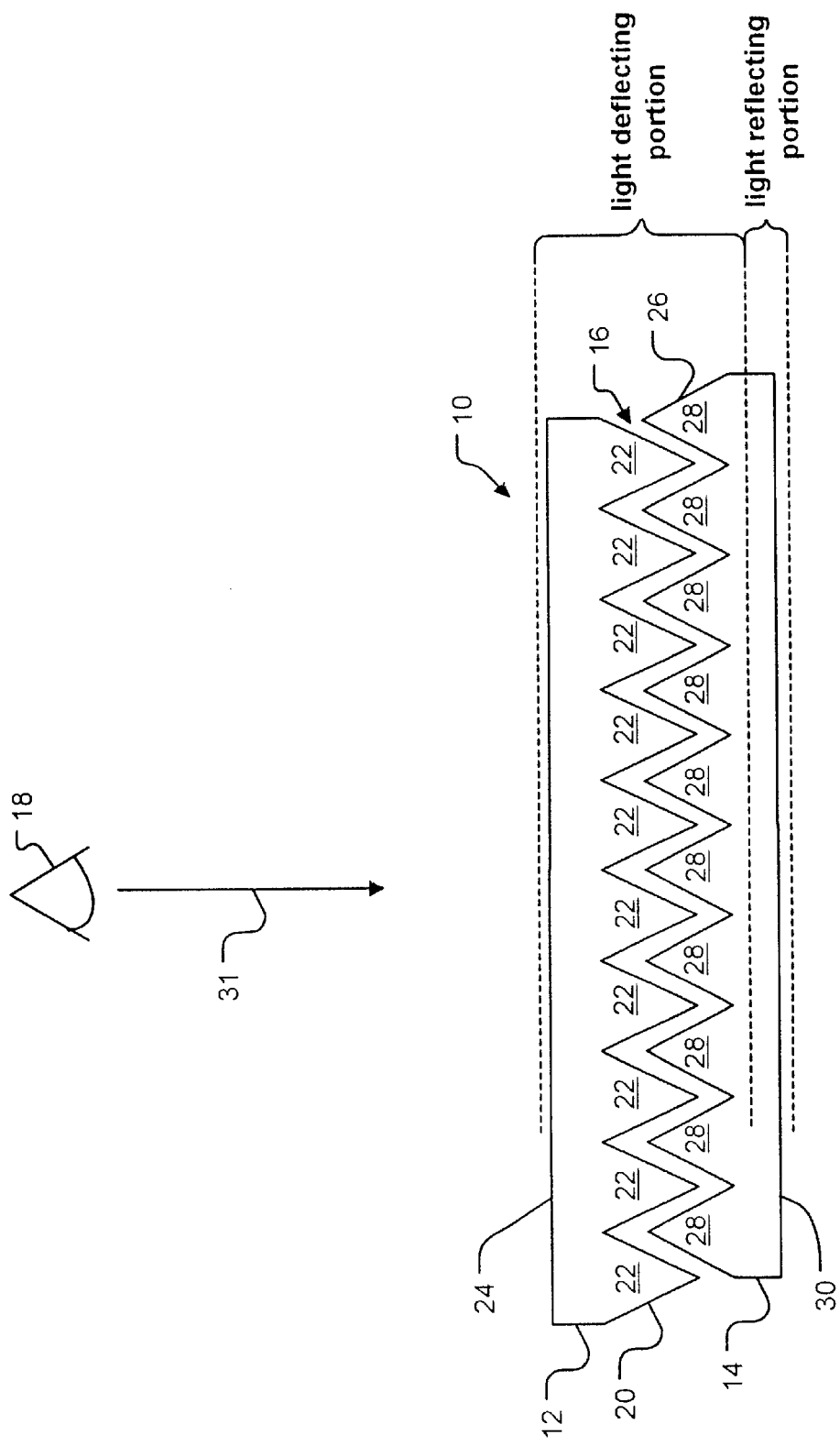
FIG. 1 is a cross-sectional side elevation view, on a greatly enlarged scale, of a portion of a reflective image display screen in accordance with the invention incorporating two prismatically inter-leaved sheets of reflective prismatic material.
Figure 2:
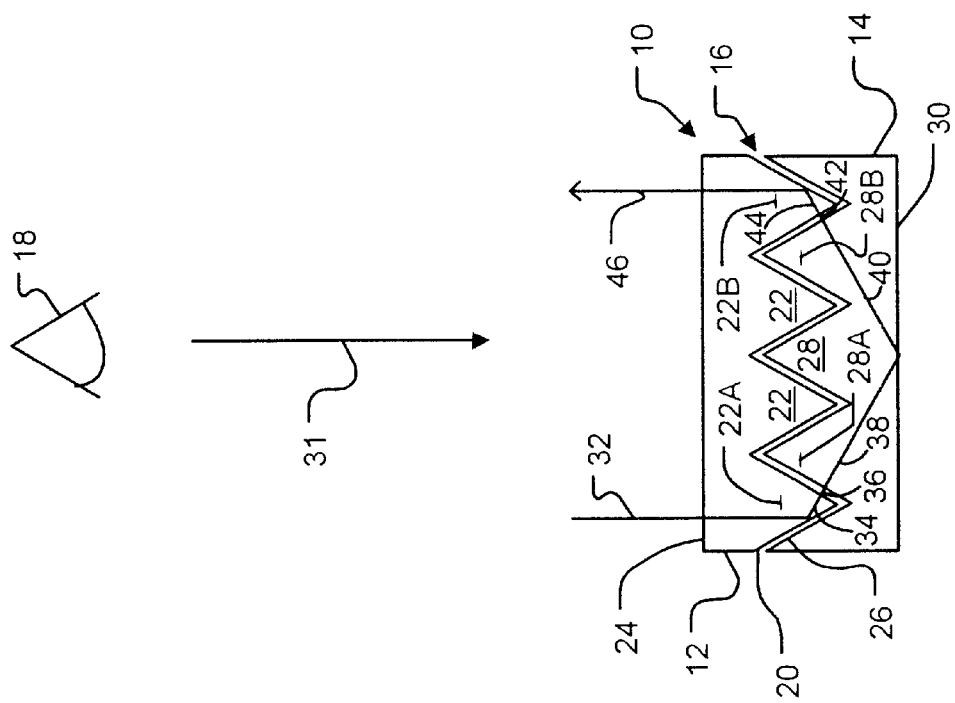
FIG. 2 depicts a portion of the FIG. 1 screen and shows how the screen reflects incident light rays which are not selectively absorbed at the screen's inward-most surface.

FIGS. 1 and 2 depict a reflective (i.e. front-lit) image display screen 10 in which outward and inward non-composite polymer sheets, 12, 14 are separated by a microscopic air gap 16 to form an image display for viewing by viewer 18. Inward surface 20 of outward or "first" sheet 12 bears a large plurality of inwardly directed prisms 22 which extend linearly and parallel to one another. The opposed, outward surface 24 of outward sheet 12 is flat. Outward surface 26 of inward or "second" sheet 14 bears a large plurality of outwardly directed prisms 28 which extend parallel to one another and parallel to the first sheet's prisms 22. The opposed, inward surface 30 of sheet 14 is flat. Viewer 18 observes screen 10 through outward surface 24 in a preferred viewing direction 31 substantially perpendicular to surfaces 24, 30.

Sheets 12, 14 are prismatically interleaved such that the apex of substantially each prism 22 projects between the opposing facets of an adjacent pair of prisms 28, and such that the apex of substantially each prism 28 projects between the opposing facts of an adjacent pair of prisms 22. This can be achieved by forming sheets 12, 14 from a prismatic film material and facing the prism-bearing surfaces of sheets 12, 14 toward one another to interleave prisms 22, 28 as aforesaid.

2370 3 M optical lighting film, available from 3 M, St. Paul, Minn. and having a refractive index of about 1.59 may be used to form sheets 12, 14. The sheet material is preferably "optically clear", in that a substantial fraction of light incident on the material at normal incidence passes through a selected thickness of the material, with only a small fraction of such light being scattered and/or absorbed by the material. Diminished optical clarity is caused by such scattering and/or absorption, typically a combination of both, as the light passes through the material. Each of sheets 12, 14 need only be approximately 10 $\mu$m thick. A material which is "opaque" in bulk form may nevertheless be "optically clear" for purposes of the invention, if a 10 $\mu$m thickness of the material scatters and/or absorbs only a small fraction of normal incident light. High refractive index composite polymer materials are also well suited to use in displays formed in accordance with the invention because they have low absorption/scattering characteristics and consequently high optical clarity in the visible light wavelength range.

A sawtooth-shaped air gap 16 at least 0.5 $\mu$m thick remains between surfaces 20, 26 after sheets 12, 14 are prismatically interleaved as aforesaid. Conventionally micro-replicated prisms are sufficiently smooth to provide high-quality optical performance, while exhibiting sufficient surface variation that when sheets 12, 14 are prismatically interleaved, surfaces 20, 26 make only occasional point contact with one another without making substantial optical contact, thus forming air gap 16. Although air gap 16 must be at least 0.5 µm thick, it need not be substantially uniform (i.e. air gap 16 is "substantially 0.5 µm thick"), so prismatic films manufactured using currently available micro-replication techniques can be used to form sheets 12, 14.

Prisms 22, 28 are preferably 60° included angle isosceles prisms. The inward facing apex of each prism 22 therefore subtends a 60° angle, and the outward facing apex of each prism 28 subtends a 60° angle. Each facet of each prism 22, 28 is thus inclined at a 30° angle relative to a vector extending perpendicular to flat surfaces 24, 30 (which are substantially parallel). Prisms 22, 28 may be formed on surfaces 20, 26 of sheets 12, 14 respectively by micro-machining initially flat sheets to generate the prisms; or, by any one of a variety of known precision moulding techniques, with the mould itself being micro-machined into the desired negative shape. The prisms are large enough to be of reasonably high optical quality (i.e. the base of each prism is wider than about 10 µm), but small enough to be essentially invisible to the naked eye (i.e. the base of each prism is no more than about 250 µm wide). Sheets 12, 14 are accordingly substantially planar on a macroscopic scale, and prismatic on a microscopic scale.

As explained in the '552 application, a low refractive index electrophoresis medium (not shown) such as Fluorinert™ Electronic Liquid (n≈1.27) can be maintained in contact with sheet 14's inward surface 30. This assists in maintaining a high effective refractive index for inward sheet 14. As is also explained in the '552 application, the electrophoresis medium contains a finely dispersed suspension of light scattering and/or absorptive particles which can be controllably electrophoretically moved through the medium to selectably frustrate TIR at selected points (i.e. pixels) at the controllable TIR interface between the electrophoretic medium and sheet 14's inward surface 30. The manner in which TIR can be controllably frustrated at inward surface 30 is explained in the '552 application and accordingly need not be described here.

Like the display disclosed in the '552 application, display screen 10 has parallel, macroscopically planar, non-light absorptive light deflecting and reflecting portions which are longitudinally symmetrical in mutually perpendicular directions, both of which directions are perpendicular to preferred viewing direction 31. As indicated in FIG. 1, the light deflecting portion of display screen 10 includes the entirety of outward sheet 12 with its prismatic inward surface 20 and also includes inward sheet 14's prismatic outward surface 26. Inward sheet 14's flat inward surface 30 constitutes the light reflecting portion of display screen 10. The light deflecting portion of the display has longitudinal symmetry in a first direction coinciding with the translational symmetry direction of prisms 22, 28. The light reflecting portion of the display has longitudinal symmetry in a second direction which is perpendicular to the first longitudinal symmetry direction. (Since the light reflecting portion of sheet 14 is flat, it has an infinite number of directions of longitudinal symmetry, only one of which is perpendicular to the first longitudinal symmetry direction).

FIG. 2 shows a typical path for a light ray striking screen 10 at normal incidence. Incident light ray 32 passes through the flat outward surface 24 of outward sheet 12, undergoes TIR at the polymer:air interface defined by the leftward (as viewed in FIG. 2) facet of prism 22A, and is reflected as ray 34 substantially perpendicularly to prism 22A's oppositely angled rightward facet. Accordingly, ray 34 is minimally refracted at the polymer:air interface between prism 22A's rightward facet and air gap 16, and passes into gap 16 as ray 36.

Ray 36 passes through air pag 16 substantially perpendicularly to the leftward (as viewed in FIG. 2) facets of prisms 28. Accordingly, ray 36 strikes the leftward facet of prism 28A substantially perpendicularly and is thus minimally refracted at the air:polymer interface between air gap 16 and sheet 14, passing into sheet 14 as ray 38. Ray 38 strikes sheet 14's inward flat surface 30 at a 60° angle relative to the aforementioned vector, which exceeds the controllable TIR interface's critical angle (53° for a polymer of refractive index 1.59 relative to Fluorinert™ Electronic Liquid FC-75 of refractive index 1.27) and is totally internally reflected as ray 40 in the absence of controlled frustration of TIR as explained in the '552 application.

Reflected ray 40 encounters the rightward facet of prism 28B substantially perpendicularly. Accordingly, ray 40 is minimally refracted at the polymer:air interface between prism 28B's rightward facet and air gap 16, and passes into gap 16 as ray 42. Ray 42 passes through air gap 16 substantially perpendicularly to the leftward facets of prisms 22. Accordingly, ray 42 strikes the leftward facet of prism 22B substantially perpendicularly and is thus minimally refracted at the air:polymer interface between air gap 16 and sheet 12, passing into sheet 12 as ray 44. Ray 44 undergoes TIR at prism 22B's rightward facet and emerges, as illustrated at 46, in a direction nearly 180° opposite to the direction of the original incident ray 32, thus achieving a "white" appearance in the reflected light.

Not all of the rays which pass through air gap 16 into sheet 14 pass directly to the controllable TIR interface at inward surface 30 as described above in relation to ray 38. More particularly, some rays which pass through air gap 16 into sheet 14 are instead partially reflected and partially refracted at the rightward facets of prisms 28. Similarly, some rays which pass through air gap 16 into sheet 12 "miss" the rightward facets of prisms 22 and are instead partially reflected and partially refracted at sheet 12's flat outward surface 24. The effect of such unwanted reflections and refractions can be substantially reduced by applying an anti-reflective coating to prismatic surfaces 20, 26.

Display screen 10's light deflecting portion deflects light rays incident in preferred viewing direction 31 toward the light reflecting portion (i.e. inward sheet 14's flat inward surface 30) by imparting to the rays a directional component in the direction of longitudinal symmetry of the light reflecting portion. The light reflecting portion totally internally reflects the deflected light rays toward the light deflecting portion at points other than selected points at which TIR is frustrated. The light deflecting portion then again deflects the totally internally reflected light rays, cancelling the directional component therefrom, such that the deflected totally internally reflected light rays emerge from the display in a direction substantially parallel to the preferred viewing direction.

The light deflecting portion of display screen 10 facilitates TIR at the controllable TIR interface by ensuring that light rays incident on the light reflecting portion exceed the relevant critical angle. For example, and as previously explained, if sheets 12, 14 are polycarbonate (n=1.59) and if a low refractive index electrophoresis medium such as Fluorinert™ Electronic Liquid (n≈1.27) is maintained in contact with sheet 14's inward surface 30, the critical angle is about 50° (i.e. only light rays incident on the controllable TIR interface at angles exceeding 53° undergo TIR). Without the light deflecting portion, light rays which encountered the light reflecting portion at typical incidence angles would not exceed the critical angle and therefore would not undergo TIR at the controllable TIR interface. Persons skilled in the art will recognize that in such rays are deflected by imparting to them a directional component in the direction of longitudinal symmetry of the light reflecting portion, the effective refractive index of the light reflecting portion is increased (addition of a component of travel in a longitudinal direction within a translationally symmetrical system increases the effective refractive index with respect to the translational motion of the rays; see: L. A. Whitehead, *Simplified Ray Tracing in Cylindrical Systems, Applied Optics, Vol.* 21, No. 19, pp. 3536–3538, Oct. 1, 1982). More particularly, the effective refractive index at the controllable TIR interface is increased, such that the effective critical angel is reduced, whereby light rays encountering the light reflecting portion at typical incidence angles undergo TIR.

It is thus possible to form sheets 12, 14 of an inexpensive, conventional plastic material such as polycarbonate without significant performance degradation in comparison to prior art displays which utilize more expensive higher index materials. However, the invention is not limited to the situation in which sheets 12, 14 are formed of a material having a refractive index of about 1.59; any appropriate material having a refractive index greater than or equal to about 1.59 can be used. If sheets 12, 14 are made from higher index materials (i.e. n>1.59) a greater fraction of the light incident on the controllable TIR interface will undergo TIR. Display screen 10's total reflectance thus increases as the refractive index of sheets 12, 14 increases.

The invention offers a number of advantages, including the ability to use conventional polycarbonate prismatic film materials to form sheets 12, 14 as aforesaid. Another advantage is the fact that outward viewing surface 24 is flat, unlike some prior art displays which have prismatic outward viewing surfaces which accordingly require some measure of protection and are more difficult to clean than flat surfaces. A further advantage is the fact that the controllable TIR interface at inward surface 30 is flat. It is much easier to reliably controllably frustrate TIR at a flat surface than at a non-flat (i.e. prismatic) surface as is found in some prior art displays.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A reflective image display screen, comprising:
    (a) a first reflective sheet having a prismatic inward surface and an opposed outward viewing surface;
    (b) a second reflective sheet having a prismatic outward surface and an opposed inward surface, said second sheet outward surface prismatically interleaved with said first sheet inward surface; and,
    (c) an air gap substantially 0.5 $\mu$m thick between said prismatically interleaved surfaces.

2. An image display screen as defined in claim 1, wherein said prismatic surfaces each comprise a plurality of 60° included angle prisms.

3. An image display screen as defined in claim 2, wherein said prisms are parallel linearly extending prisms.

4. An image display screen as defined in claim 3, wherein said prismatically interleaved sheets further comprise:
    (i) substantially each one of said first sheet prisms projects between opposing facets of an adjacent pair of said second sheet prisms; and
    (ii) substantially each one of said second sheet prisms projects between opposing facets of an adjacent pair of said first sheet prisms.

5. An image display screen as defined in claim 3, wherein said first sheet outward viewing surface is flat.

6. An image display screen as defined in claim 3, wherein said second sheet inward surface is flat.

7. An image display screen as defined in claim 3, wherein said first sheet outward viewing surface is flat and said second sheet inward surface is flat.

8. An image display screen as defined in claim 3, wherein said first and second sheets are formed of a polycarbonate material.

9. An image display screen as defined in claim 3, wherein said first and second sheets are formed of a material having a refractive index of about 1.59.

10. An image display screen as defined in claim 1, said screen having a preferred viewing direction, and wherein:
    (a) said first reflective sheet and said prismatic surfaces together comprise a substantially macroscopically planar and substantially non-light absorptive light deflecting portion of said screen having longitudinal symmetry in a first direction substantially perpendicular to said preferred viewing direction;
    (b) said second sheet inward surface comprises a substantially macroscopically planar and substantially non-light absorptive light reflecting portion of said screen having longitudinal symmetry in a second direction substantially perpendicular to said first direction and substantially perpendicular to said preferred viewing direction, said light reflecting portion substantially parallel to said light deflecting portion;
    (c) said light deflecting portion deflects light rays incident upon said display in said preferred viewing direction toward said light reflecting portion by imparting to said incident light rays a directional component in said second direction;
    (d) said light reflecting portion totally internally reflects said deflected light rays toward said light deflecting portion; and,
    (e) said light deflecting portion deflects said totally internally reflected light rays by cancelling said directional component from said totally internally reflected light rays, such that said deflected totally internally reflected light rays emerge from said screen in a direction substantially parallel to said preferred viewing direction.

\* \* \* \* \*